(12) United States Patent
Bernal et al.

(10) Patent No.: US 8,284,450 B2
(45) Date of Patent: Oct. 9, 2012

(54) STREAK COMPENSATION IN COMPRESSED IMAGE PATHS

(75) Inventors: Edgar Bernal, Webster, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 467 days.

(21) Appl. No.: 12/246,690

(22) Filed: Oct. 7, 2008

(65) Prior Publication Data

US 2010/0085603 A1  Apr. 8, 2010

(51) Int. Cl.
*G06K 15/00* (2006.01)

(52) U.S. Cl. ......... 358/2.1; 382/233; 382/167; 382/250; 358/3.26; 358/3.27

(58) Field of Classification Search ................ None
See application file for complete search history.

(56) References Cited

U.S. PATENT DOCUMENTS

| | | | |
|---|---|---|---|
| 6,009,192 A * | 12/1999 | Klassen et al. | 382/167 |
| 6,097,838 A * | 8/2000 | Klassen et al. | 382/167 |
| 6,643,406 B1 * | 11/2003 | Hajjahmad et al. | 382/240 |
| 6,715,127 B1 * | 3/2004 | Eschbach et al. | 715/202 |
| 6,728,406 B1 * | 4/2004 | Murao | 382/191 |
| 6,760,056 B2 * | 7/2004 | Klassen et al. | 347/251 |
| 7,038,816 B2 | 5/2006 | Klassen | |
| 7,090,324 B2 * | 8/2006 | Mizes | 347/19 |
| 7,095,531 B2 | 8/2006 | Mizes | |
| 7,125,094 B2 | 10/2006 | Mizes | |
| 7,313,696 B2 * | 12/2007 | de Queiroz | 713/168 |
| 7,528,971 B2 * | 5/2009 | Harrington | 358/1.13 |
| 2002/0075379 A1 * | 6/2002 | Klassen et al. | 347/251 |
| 2004/0008904 A1 * | 1/2004 | Lin et al. | 382/275 |
| 2006/0077488 A1 | 4/2006 | Zhang | |
| 2010/0046034 A1 * | 2/2010 | Nagarajan et al. | 358/2.1 |

OTHER PUBLICATIONS

JPEG 2000 From Wikipedia.*

* cited by examiner

*Primary Examiner* — Twyler Haskins
*Assistant Examiner* — Christopher D Wait
(74) *Attorney, Agent, or Firm* — Fay Sharpe LLP

(57) ABSTRACT

In accordance with the present disclosure, there is provided a method for compensating tones on a compressed digital image data. The method comprises generating the compressed digital image from an input digital image data using a wavelet-based compression method; recovering a low resolution version of the input digital image data from the compressed digital image data by partially decompressing the compressed digital image; applying compensating tone reproduction curves (TRC) to the low resolution version of the input digital image data to generate a compensated low resolution image; re-compressing the image using the compensated low resolution image; and, subsequently decompressing all of the compensated pixel arrays to produce decompressed compensated image data.

14 Claims, 9 Drawing Sheets

US 8,284,450 B2

STREAK COMPENSATION IN COMPRESSED IMAGE PATHS

CROSS REFERENCE TO RELATED PATENTS AND APPLICATIONS

The following applications, the disclosures of which being totally incorporated herein by reference are mentioned: U.S. application Ser. No. 12/248,217, Filed Oct. 9, 2008, by Edgar Bernal et al., entitled "Streak Compensation In Compressed Image Paths". "Inter-Separation Decorrelator," U.S. Pat. No. 7,846,416, Issued Feb. 3, 2009, E. Dalal, W. Wu, R. Loce, R. Bala, Y. Zhang. "Color Compensation of Images," U.S. Pat. No. 7,864,364, Issued Jan. 4, 2011, and U.S. application Ser. No. 11/200,277, Filed Aug. 9, 2005, Y. Zhang, R. Loce, R. Bala. "Printer Directed Image Decompression," ID 20041740, E. Moore, P. Emmett.

BACKGROUND

Data compression is utilized in data handling processes, where too much data is present for practical applications using the data. Commonly, compression is used in communication links, to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

Generally, an image does not change very much on a pixel to pixel basis and therefore has what is known as "natural spatial correlation". In natural scenes, correlation is generalized, but not exact. Noise makes each pixel somewhat different from its neighbors, but the natural spatial correlation enables not only the compression of digital image data, but the performance of certain image processing operations on the compressed data. Contrariwise, in synthetic graphics and computer-generated text, the correlation tends to be much higher, with colors limited to a small set. The limited set of colors and high correlation make these image types good candidates for lossless compression, at possibly higher compression ratios than those achievable with lossy compression schemes.

Spatial uniformity correction via spatially varying tone reproduction curves (TRCs) and spatial N-dimensional color transformations have been demonstrated to be very effective for streak compensation on several print engines. However, current implementations apply to uncompressed image data. It is desirable to enable streak compensation on compressed images. For some products, it may be advantageous to perform the compensation in the digital front end (DFE), where the image data is compressed. Also, applying compression in the DFE can save significant hardware costs.

Some implementations carry the compressed image data further down the image path. The present disclosure will be described in connection with particular lossy (i.e. JPEG, and JPEG2000 encoded image data), compression embodiments. The disclosure will also be described in connection with run length encoded image data (i.e. compressed line work). The present disclosure presents a streak compensation method and print system for several forms of compressed image data types utilized by various image marking engines.

BRIEF DESCRIPTION

In accordance with the present disclosure, there is provided a method for compensating tones on a compressed digital image data. The method comprises generating the compressed digital image from an input digital image data using a wavelet-based compression method; recovering a low resolution version of the input digital image data from the compressed digital image data by partially decompressing the compressed digital image; applying compensating tone reproduction curves (TRC) to the low resolution version of the input digital image data to generate a compensated low resolution image; re-compressing the image using the compensated low resolution image; and, subsequently decompressing all of the compensated pixel arrays to produce decompressed compensated image data.

In accordance with the present disclosure, there is provided In a printing system for processing document images an apparatus for performing streak compensation on compressed digital image data. The apparatus being operable to generate the compressed digital image from an input digital image data using a wavelet-based compression method; recover a low resolution version of the input digital image data from the compressed digital image data by partially decompressing the compressed digital image; apply spatially varying compensating tone reproduction curves (TRC) to the low resolution version of the input digital image data to generate a streak compensated low resolution image; and, subsequently decompress all of the image data to produce decompressed compensated image data.

One aspect of the present disclosure provides a method for performing streak compensation on a compressed digital image data. The method comprises identifying a type compression applied to the image; directing the compressed digital image data to a streak compensation module suitable for performing streak compensation on the type of compressed digital image data; and, performing streak compensation using the compressed digital image data using the suitable streak compensation module.

DETAILED DESCRIPTION

Figure 1:
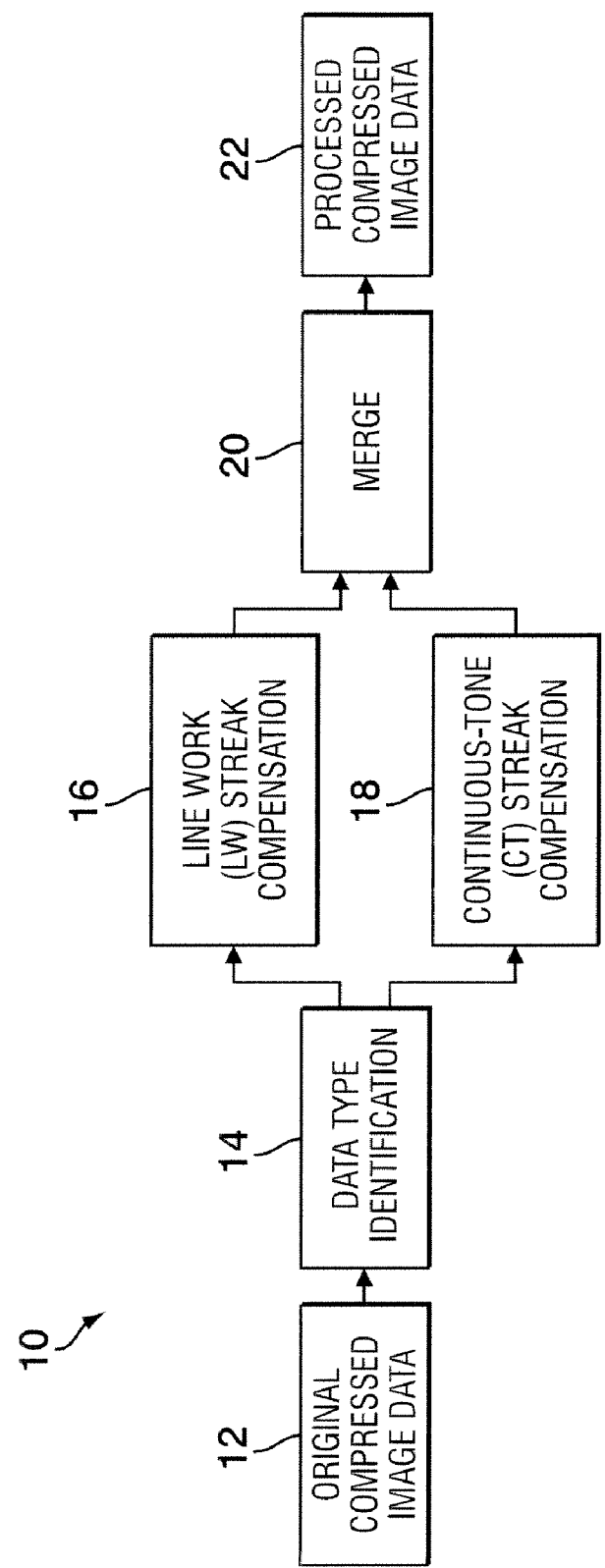
FIG. 1 is a high level diagram showing the general image path of a first embodiment according to the present disclosure.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. When an item of data can indicate one of a number of possible alternatives, the item of data has one of a number of "values." The term "data" includes data existing in any physical form, and includes data that are transitory or are being stored or transmitted. For example, data could exist as electromagnetic or other transmitted signals or as signals stored in electronic, magnetic, or other form. An "image" is a pattern of physical light. An image may include characters, words, and text as well as other features such as graphics. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image. An item of data "defines" an image set when the item of data includes sufficient information to produce all the images in the set.

A "pixel" is the smallest segment or region into which an image is divided in a given system. As used herein, each pixel value is a set of color space coordinates in a "color coordinate form" of an image, the color coordinate form being a two-dimensional array defining the image.

A "memory" or "storage medium" is a physical medium that can store data. Examples of data storage media include magnetic media such as hard and floppy disks, and magnetic tape; optical media such as laser disks and CD-ROMs; and semiconductor media such as semiconductor ROMs and RAMs.

A "data unit" or "unit of data" is an item of data that a processor can access or otherwise operate on as a unit. For example, an eight-bit byte is a data unit in many data processing systems. A "block" of items of data is a number of items of data that form a sequence. For example, a block or segment of an image would include data or signals representative of image pixels within a defined region of the image. As used herein a region may be a single pixel in size or may consist of a plurality of pixels.

An operation "encodes" or "compresses" items of data, when performing the operation on the items of data produces different items of data from which the encoded or compressed data items can subsequently be recovered. The operation that recovers the encoded or compressed data items is "decoding" or "decompressing." When the operation is "lossy", the decoding or decompressing operation only recovers data that is approximately the same as the original data.

An "image input terminal" (IIT) is a device that can generate or receive an image and provide an item of data defining a version of the image. A "scanner" is an image input device that receives an image by a scanning operation, such as by scanning a document. Other image input terminals include facsimile machines and computer graphic workstations.

An "image output terminal" (IOT) is a device that can receive an item of data defining an image and provide the image as output. A "display" is an image output device that provides the output image in human viewable form and a "printer" is an image output device that renders the image on a substrate in human viewable form. The visible pattern presented by a display is a "displayed image" or simply "image."

Color correction in digital images is an image processing operation comprising two steps: a correction from 3-D device independent color space (e.g., $YC_r C_b$, RGB, XYZ, or $L^*a^*b^*$) to a 3-D device dependent color space; and then a conversion to CMYK comprising under-color removal (UCR), gray-component replacement (GCR) and linearization processes. It will be appreciated, however, that for some devices, not all of the processes in the second step are required. For example, three color devices do not need the UCR/GCR stage. Typically, the two color correction steps are accomplished in a single operation using a three-dimensional look-up table carrying out three-dimensional interpolation such as that described in U.S. Pat. No. 5,581,376 to Harrington. However, the color correction process may also be represented as the combination of two phases: a 3-to-3 color space correction (e.g., RGB-R'G'B') followed by a device-dependent color space transformation operation (e.g., R'G'B'-CMYK for four color devices). The ability to separate the color correction process into these two steps forms the basis for the present disclosure, where the more difficult of the two steps, namely the first color correction, can be accomplished on the compressed digital data so as to significantly expedite the overall correction process. The advantage being that the 3-to-3 color correction operation may be performed on only part of the information using a compressed data format. For instance, the correction process is preferably accomplished by a digital printer that receives the print data in a compressed format. In another approach, additional colorants can be used such as extended gamut (e.g., orange, red, green, purple) and light colorants (e.g., light cyan, light magenta, light black) to match traditional colorants (CMYK). The subject embodiments can be employed with substantially any application including extended gamut applications and/or with disparate colorants.

A digital imaging system can include an image source for generating image data that is supplied to an image processing system, the latter incorporating what is known in the art as a digital front end (DFE). The image processing system can produce output image data for rendering by the print engine. The image source may include a scanner, a computer, a network, or other similar or equivalent image input components. The print engine can be a xerographic engine; however, the print engine may include alternative printing or reprographic technologies such as photographic, ionographic, ink jet, etc. The following description of the present disclosure includes operation of the image processor, wherein a method for performing streak compensation is described.

With reference to FIG. 1, the present disclosure provides an image path and image path method of performing streak compensation on compressed image data. The method applies to both run-length encoded image data, i.e. compressed Line Work (LW), and lossy JPEG-type image data, i.e. Continuous Tone (CT). The method can utilize tags or some form of image metadata to distinguish the type of image, and can send the CT and LW data to an appropriate streak compensation processor, then recombine the compensated data. The module that performs compensation on CT data can include the following elements: (1) recover DC coefficients of the image blocks; (2) apply compensating TRCs to the DC coefficients of each block on a block-column basis; and, (3) re-compress the compensated image data. The LW compensation module can include the following elements: (1) decode runlengths; (2) apply compensating TRCs; and, (3) re-encode runlengths. Optionally, the LW compensator can examine the compensating TRCs over a runlength, and split the run where the TRC changes for the given gray value. The output TRC value would be used for a given new segment of run length. Another scenario occurs when two adjacent runlengths are merged into a single runlength because the TRC maps both runlength values to a unique output value. The disclosure can be used to intercept image paths of other applications not presently discussed.

Spatial uniformity correction via spatially varying TRCs has been demonstrated to be very effective for streak compensation on several variety of print engines. Spatial uniformity correction via spatially varying TRCs directly affects image uniformity and aids the achievement of consistency/stability goals, and it aids in achieving consistency between two engines and stability over time by producing color characterization and calibration pages that are more spatially uniform. Hence, color characterizations and calibrations can be performed with more precision.

A print system (not illustrated) can include an image input terminal (IIT) that may include any number of image sources such as a color scanner or storage medium (disk) suitable for generating or otherwise providing a digital document. A digital document containing an image is the output of the IIT, and is provided to the image handler that forms a part of the printing system. The image handler, while preferably providing additional functionality, includes an electronic subsystem (ESS) for carrying out the image processing and compression operations in accordance with the present disclosure.

In a JPEG compression embodiment, the image handler can include an image blocking circuit capable of dividing the digital data representing the image into a plurality of M×M blocks or segments. In one embodiment, the blocking operation may be accomplished by a windowing or cropping circuit that enables the transfer of data comprising one or more M×M blocks of data from the input document to an M×M data buffer. The image blocking operation preferably operates to identify segments of 8 pixels by 8 scanlines for each of the three color or more separations. Once stored in a data buffer that is part of the image processing circuit, the data is next operated on by the JPEG compression circuitry. The data may be operated on using various compression operations associated with the JPEG compression standard to accomplish the compression of the image data within a block.

Once compressed, the M×M block of data is then preferably processed by an image processor, where the first phase color correction of a block is accomplished. An image processor may be a software driven process operating on a CPU within the image processing system, or it may be a specialized piece of hardware. The output of the image processor is a coded or compressed unit of data that is either subsequently stored in electronic precollation (EPC) memory, or further decompressed before undergoing the second phase color correction.

IOT can be a raster output scanning (ROS) print engine including a laser driving circuit that controls or modulates a laser in accordance with decompressed, color corrected digital data produced by a first image processor, which may also operate in conjunction with various aspects of image processor. One or more lasers in the ROS-based IOT can be used to illuminate or expose a photoresponsive member by reflecting the laser generated light beam off of the plurality of surfaces found on a rotating polygon so as to create, by scanning, a latent image.

Once the latent image is produced, it would be developed in accordance with any of a number of methods known to those skilled in the art to produce a visible image. It will be further appreciated that the digital image data may be employed to drive or otherwise control any number of image output terminals, particularly color output devices where the data representing an image typically includes at least four color separations (e.g., cyan, magenta, yellow and black) each processed and stored as a separate image plane or in luminance-chrominance form to further reduce storage requirements.

Current implementations of streak compensation typically apply to uncompressed images. It is becoming desirable to enable streak compensation on compressed image data. Many applications being pursued carry compressed image data further down the image path, at least to the point where TRCs are applied to the image. For some products it may be advantageous to perform the compensation in the DFE, where the image data is compressed. Also, applying compression in the DFE can save significant hardware costs.

Printing systems typically employ compression techniques to reduce data size and increase effective throughput at portions of an image path. The type of compression used depends on the type of data being compressed. For instance, some next generation image marking engines use run-length encoding for lossless compression and JPEG coding for lossy compression. Run-length encoding can be applied to text and graphical data (i.e. LW data), whereas continuous-tone data (i.e. CT data) is compressed with JPEG. The JPEG algorithm can group the source image samples into 8×8 pixel blocks and processes the blocks separately by applying a DCT transformation that results in one DC coefficient and sixty three AC coefficients per block. The stream of coefficients can then be quantized and entropy-encoded.

Lossy compression can also be achieved via wavelet-based compression techniques such as JPEG2000. Images are decomposed into different levels by means of a wavelet transformation. The decomposition levels contain sub-bands with coefficients that describe the horizontal and vertical spatial frequency characteristics of the image. The different number of spatial resolutions can be described as the total number of decomposition levels, $N_L$. Although there are as many coefficients as there are samples, the information tends to be concentrated in a few coefficients. The information of the transform coefficients is further reduced by quantization. Entropy coding reduces the number of bits required to represent the quantized coefficients.

Current implementations of monochromatic streak compensation operate on full-resolution, as spatially varying TRCs work on a pixel-column basis. Other applications propose that JPEG compressed data be color corrected by partially decompressing the low order terms of the DCT expansion. One aspect of the present disclosure utilizes this form of color correction in a spatially varying manner. The present disclosure proposes an image path that performs streak compensation on both LW and CT data. After compensation the CT and LW data are merged into a single compressed data stream.

The methodology presented hereinafter applies to monochromatic compression and streak compensation. Since a typical image path processes each color plane separately, both methods can be applied to color images with minor modifications. For example, N-dimensional color transformations (i.e. CMY to CMY, CMYK to CMYK or multi-dimensional TRCs) are also supported by applying the above described methods to the individual planes, extracting the suitable pixel or block values, using them in the color transformation, and using the transformed values for re-encoding.

Although the methods to be described hereinafter focus on the monochrome applications, both methods are readily extended to color images and color image paths. In both cases, N-dimensional color transformations can be applied on the partly uncompressed image data. A high level diagram 10 showing the general image path of the present disclosure is provided in FIG. 1. Data-type identification 14 of some region of image data 12 is performed to allow the proper type of compensation to be performed to that region. The data-type identification 14 process can be achieved through any of several possible processes, such as reading tags, recognizing page description language commands, or reading some form of image meta data. For example, a multi-mode compression specification can employ packet headers to distinguish between the different types of compressed data. Once the region is identified, the image data 12 is directed to the appropriate compensator; i.e. a line work (LW) compensator 16 or a continuous tone (CT) compensator 18. After the region is compensated it can be integrated into an output image along with other compensated regions—that is, the CT and LW data are merged 20 into a single compressed data stream 22.

Figure 2:
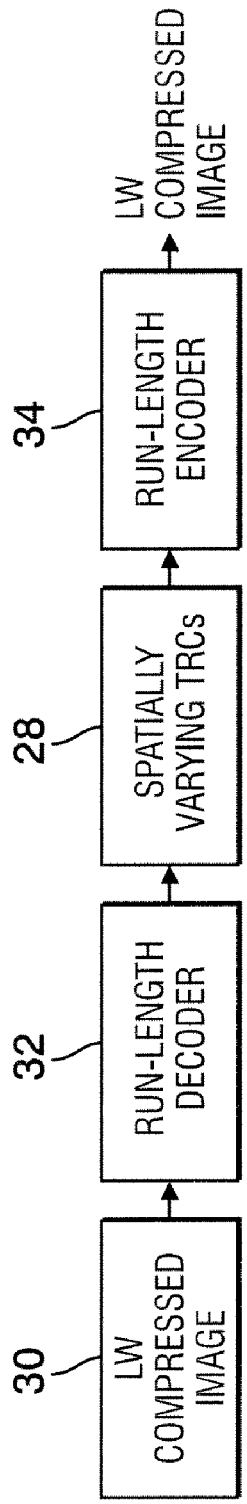
FIG. 2 is a brute-force method of streak compensation of Line Work (LW) image data.

LW data can be losslessly compressed by means of a run-length encoder that converts chains of repeated identical bytes of the data stream into a stream consisting of bytes of pixel information along with the number of repetition of the bytes, or run. One way of applying spatially varying TRCs 28 to LW data 30 is to decode the run-length encoded stream 32 to recover the original, full resolution image data and apply the compensation to the data to obtain a spatially uniform data stream. This processed stream can then be run-length encoded 34. This exemplary brute-force method of streak compensation of LW image data is illustrated in FIG. 2.

Figure 3:
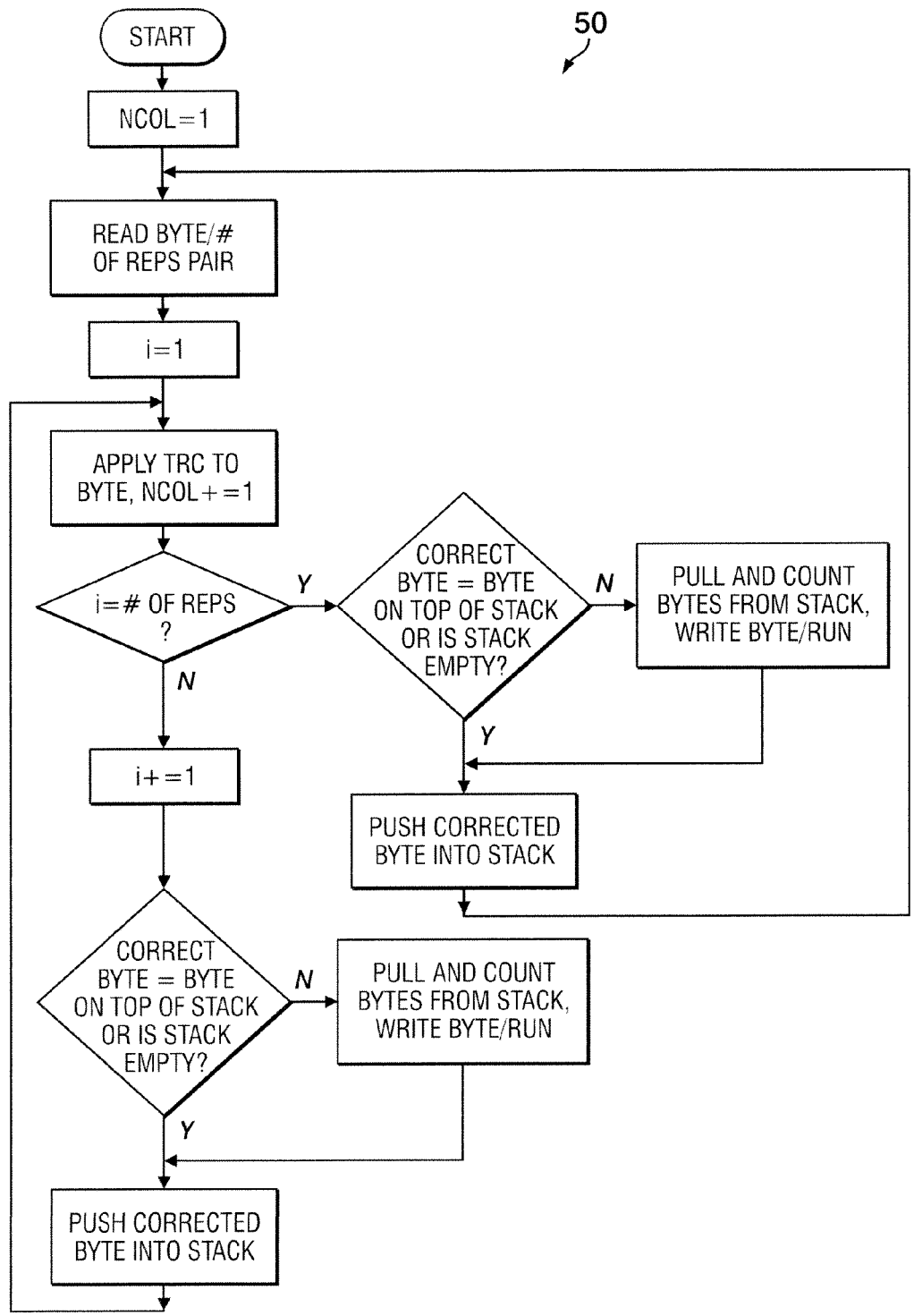
FIG. 3 shows another method of streak compensation of Line Work (LW) image data.

There can be another way of performing spatial compensation to LW data in a single module (refer to FIG. 3) that breaks and creates run-length chains as it applies the spatially varying TRCs simultaneously, without decoding the full stream of LW data. The algorithm 50 can read one pair of byte/number-of-repetitions at a time, apply the spatially varying TRCs while keeping count of the column number, and store the open-ended chain of characters in a stack for further processing when reading the next pair. FIG. 3 contains a flow chart 50 for the process of correcting a single row of LW data (i.e. method of streak compensation of LW image data).

Figure 4:
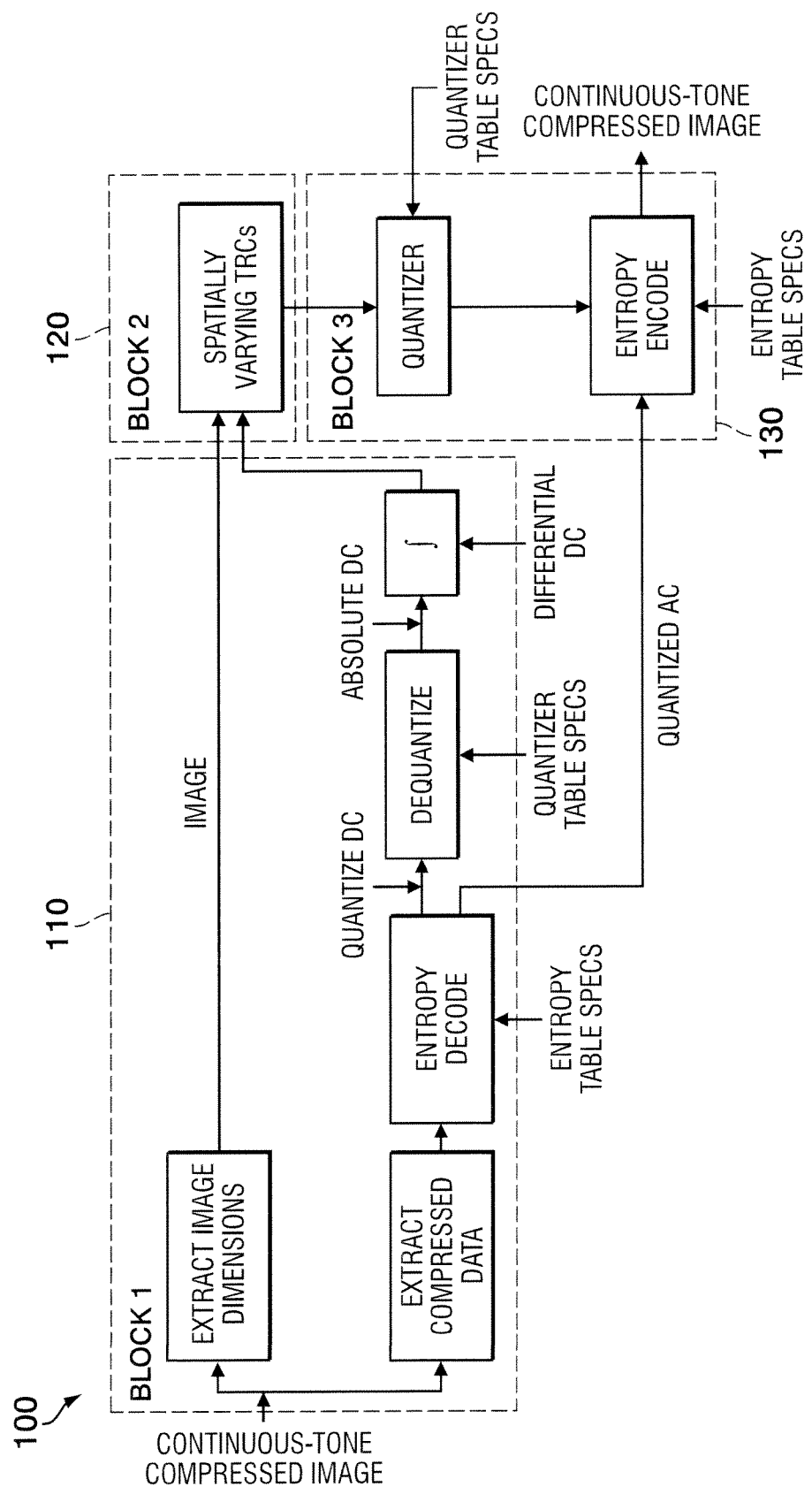
FIG. 4 is a continuous tone (CT) streak compensation module displaying three sub-modules.

The CT streak compensation module 100 can include three sub-modules as shown in FIG. 4. A first block or module 100 can recover the DC coefficients of the image blocks. This block extracts the image dimensions from the compressed data stream header and feeds the image width, W to the second block or module 20. It also extracts the compressed image data from the data stream's body and processes it to obtain the DC and AC coefficients corresponding to the transformation of each of the N×N pixel blocks (i.e. N=8). The stream of DC coefficients is fed to the second block 120 and the stream of AC coefficients is fed to the third block or module 130.

A streak compensation module 120 can apply the compensating TRCs to the DC coefficients of each block on a block-column basis. Module 120 applies the spatially varying TRCs to the DC coefficients of each pixel block. The TRCs operate on a block-column basis, and the total number of block-columns is $B=\lceil W/N \rceil$, and the m-th DC coefficient belongs to column C such that m=C+Kb, where k is any integer number that satisfies the equation.

Module 130 can recompress the compensated image data. Module 130 encodes the modified DC coefficients and the unmodified AC coefficients into a compressed data stream.

Referring again to FIG. 4, the CT streak compensation module 100 and the three modules (block 1, 2, and 3) can be described in detail as follows:

The image dimensions are extracted from the header of the compressed data stream. The width of the image, W is relayed to module 120. The body of the compressed data stream containing the encoded DC and AC coefficient information is read. The entropy-encoded data stream of coefficients can be decoded with the aid of a Huffman entropy code table used at encoding. Huffman tables may be fixed or computed specifically for a given image. The resulting stream of data corresponds to the quantized coefficients of the N×N image blocks. The DC coefficients are relayed to the following stage in the block, while the AC coefficients are passed on to module 130. The quantized DC coefficients are dequantized with the aid of the quantizer table used by the encoder, which specifies the step size used in the quantization. Dequantization is achieved by multiplying the quantized coefficient by the step size of the quantizer used by the encoder.

The DC coefficients are the average of each of the N×N image blocks. There is a strong correlation between the DC coefficients of adjacent blocks, and the quantized DC coefficient can be encoded as the difference from the DC term of the previous block in the encoding order. Thus, it is necessary to integrate the dequantized, differentially encoded coefficients to obtain the absolute DC coefficients, which are relayed to module 120.

Referring again to module 120, the TRC correction can be applied on a block-column basis, each block-column consisting of N columns. The TRC of each block-column contains information on how much to increase or decrease the digital value of the block-column in question to achieve increased spatial uniformity. In a compressed image path, the TRC correction is applied to the DC coefficient of the block being processed. Information about the width of the image is used by this block in order to calculate the total number of block-columns in an image, as every block in a given block-column will be processed identically. If the image width is W pixels, then the number of block-columns is $B=\lceil W/N \rceil$. This block should keep count of the number of blocks being processed. The block-column to which the m-th block belongs is column C such that m=C+kB, where k is any integer number that satisfies the equation.

Referring again to module 130, the stream of corrected DC coefficients may be quantized using the same quantization table applied by the original encoder. Because there is usually strong correlation between the DC coefficients of adjacent blocks, the quantized DC coefficient is encoded as the difference from the DC term of the previous block in the encoding order.

The combined stream of DC and AC coefficients may be entropy-encoded using the same entropy table applied by the original encoder. Alternatively, if a table is computed specifically for the updated stream, it can be specified for any further processing.

Figure 5:
FIG. 5 is a brute-force method of streak compensation of gzip-compressed Line Work (LW) image data.

Another method of multi-mode compression can utilize gzip compression instead of run-length coding for lossless compression. Gzip is a combination of Lempel-Ziv and Huffman Coding. It can find duplicated strings in the input data. Repeated occurrences of a string are replaced by a pointer to the original occurrence of the string. The sequence of strings and the sequence of pointers can be compressed with two separate Huffman trees. The present disclosure can be applied to this type of data by modifying the LW Streak Compensation module. The module would read the Huffman trees used to encode the data, use that information to obtain the Lempel-Ziv-encoded data, and decode the data to obtain the full-resolution image data. It can then apply the spatially varying TRCs to the data and encode the corrected data. This brute-force method is illustrated in FIG. 5.

Referring to FIGS. 6-9, the present disclosure can also provide an image path and image path method of performing streak compensation on JPEG2000 compressed image data. The method applies to lossy compressed image data, which is usually of the continuous tone (CT) type. The image path and method has the following key elements: (1) recovery of a lower-resolution version of the original image from the stream of compressed data; (2) application of compensating TRCs to the lower-resolution image on a pixel-column basis, such as applying a smoothed, full resolution version of the low-resolution TRCs to the full-resolution image (the resulting TRC is a smoothed version of the low resolution TRCs as a consequence of the inverse transformation and the spatially varying TRC can be applied to the low resolution image plane, which has an effect similar to applying a smoothed TRC to the full resolution image.); and, (3) re-compression of the compensated image data.

The following streak compensation method can be applied to JPEG2000 compressed image data as described below. JPEG2000 can perform a wavelet transform on the image creating decomposition levels that are made up of sub-bands of coefficients describing the frequency characteristics of local areas. These coefficients are then quantized and entropy coded. A work-flow where PDL print jobs are sent to the printer with references to the images rather than the images themselves has been proposed exploiting the multi-resolution nature of JPEG2000. The multi-resolution aspect of JPEG2000 can be exploited by applying a color correction method to lower-resolution versions of the compressed image, thus making it unnecessary to fully recover the original image in the compensation process.

The portion of the image path that performs compensation on the compressed data has the following elements: (1) recover a lower resolution version of the original image from the stream of compressed data; (2) apply compensating TRCs to the lower-resolution image on a pixel-column basis; i.e. apply a smoothed, full-resolution version of the low-resolution TRCs to the full-resolution image; and, (3) re-compress the compensated image data.

Figure 6:
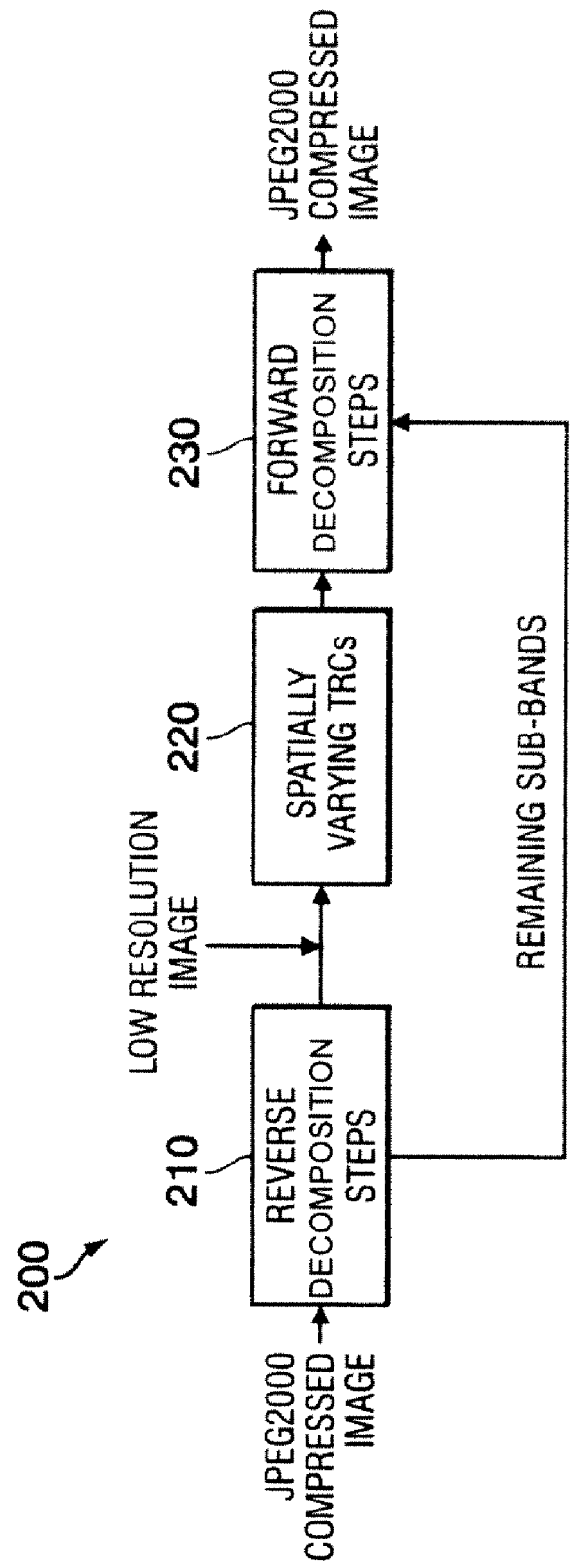
FIG. 6 is a high level diagram showing the general image path of a second embodiment according to the present disclosure.

A high-level diagram 200 showing the general image path of JPEG2000 compressed image is provided in FIG. 6. JPEG2000 transforms the image into a set of two-dimensional sub-band signals, each representing the activity of the image in various frequency bands at various spatial resolutions. Each successive decomposition level of the sub-bands has approximately half the horizontal and half the vertical resolution of the previous level. The reverse decomposition module 210 reverses as many decomposition steps as necessary to obtain a low-resolution version of the original image with resolution equal to the spatial resolution of the spatially varying TRCs available. The second module applies the spatially varying TRCs 220 to the lower resolution image. The last module performs the forward decomposition steps 230 on the modified low-resolution image and the unmodified remaining decomposition sub-bands to obtain a compressed version of the corrected image.

Figure 7:
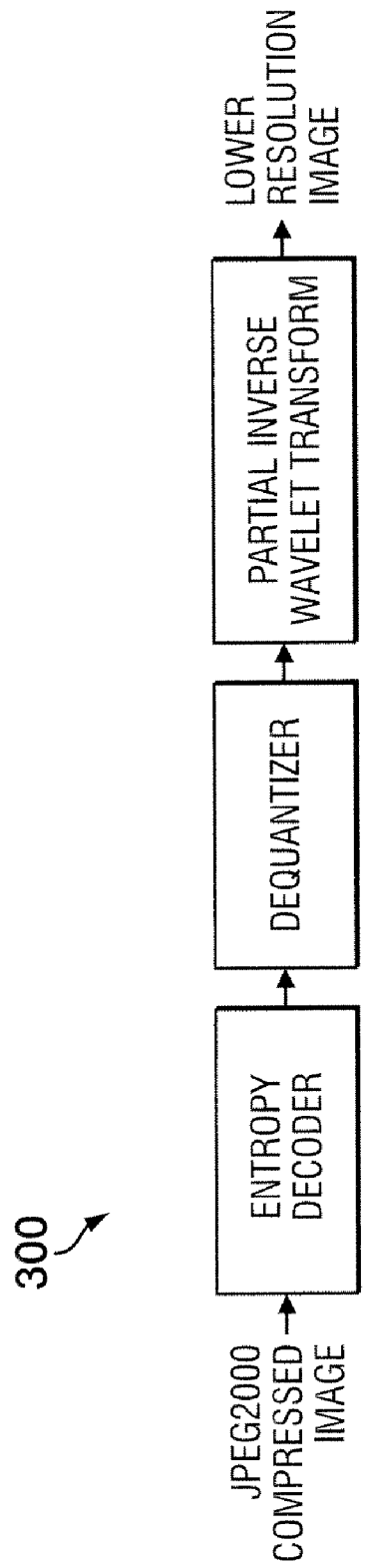
FIG. 7 is a detailed flow of the reverse decomposition of FIG. 6.

An algorithm 300 reverses the entropy coding, the quantization, and the number of decomposition steps required to recover a low-resolution version of the original image whose resolution matches the spatial resolution of the spatially varying TRCs available, as illustrated in FIG. 7. The number of wavelet transform or decomposition steps that need to be reversed depends on both the total number of decomposition levels used in the compression step and on the resolution of the available TRCs, as explained below. The remaining decomposition sub-bands are passed on unmodified to the last module.

If the resolution of the original image be R, in dpi; then, at each (forward) decomposition level L, a version of the original image with resolution $R/2^L$ is available if both the number of rows and the number of columns of the original image are divisible by $2^L$. If this is not the case, then the actual resolution depends on the way the algorithm is implemented. A lower resolution image is the product of the application of a low-pass filter followed by a down-sampling by a factor of 2 along each direction of the image; i.e. first along columns and then along rows, or vice versa, as the process is commutative a total of L times. Assuming that the spatially varying TRCs that are available to the algorithm operate at resolution $R/2^T$ dpi, and that $N_L \geq T$, the first block of the algorithm reverses a total of $N_L - T$ decomposition steps.

Figure 8:
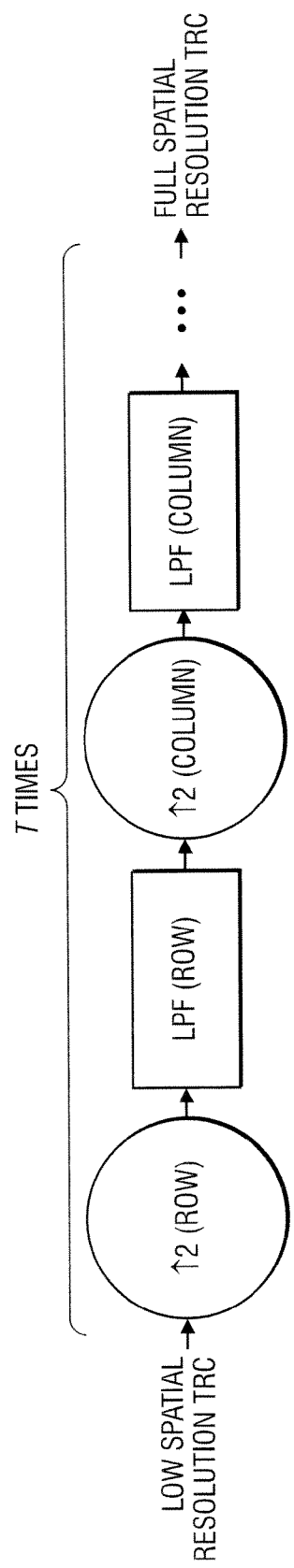
FIG. 8. Displays the correspondence between the applied low spatial resolution TRC and its equivalent full spatial resolution TRC; and, FIG. 9 is a detailed flow of the forward decomposition step of FIG. 6.

The streak compensation module applies the low spatial resolution, spatially varying TRCs, to a version of the original image with the same spatial resolution as the TRCs. This lower resolution image is the sub-band resulting from the application of a low-pass filter (the Daubechies low-pass filter of length 9 used in the forward wavelet transformation) followed by a down-sampling by a factor of two along each direction of the image; i.e. first along columns and then along rows, or vice versa, as the process is commutative, multiple times. Each successive decomposition level of the sub-bands has approximately half the horizontal and half the vertical resolution of the previous level. Then, if the original image has N rows, M columns and a resolution of R dpi, the sub-band on which the compensation is applied will have $\lceil N/2^T \rceil$ rows, $\lceil M/2^T \rceil$ columns, a horizontal resolution of $\lceil N/2^T \rceil \times R/N$ dpi, and a vertical resolution of $\lceil M/2^T \rceil \times R/M$ dpi, where T is the decomposition level at which the compensation is applied. Applying the TRC to the low-resolution version of the image is equivalent to adding an image with $\lceil N/2^T \rceil$ rows and $\lceil M/2^T \rceil$ columns to this sub-band. This compensation image is formed by the application of the $\lceil M/2^T \rceil$ columns of the low-resolution, spatially varying TRC across the $\lceil N/2^T \rceil$ rows of the low-resolution image. Since the wavelet transformation is linear, the effect (on the full-resolution image) of applying the compensation to the low-resolution image, is the addition of a full resolution image corresponding to the T-level inverse transformation of the decomposition formed by the low-frequency sub-band equal to the compensation image, and the remaining sub-bands filled by zeroes. The aforementioned is approximately equivalent to applying a full-resolution TRC resulting from the up-sampling by a factor of 2, and low-pass filtering (with the Daubechies low-pass filter of length 7 used in the inverse wavelet transformation) of the low-resolution TRC, first along rows and then along columns, or vice versa, T times. This is only an approximation because quantization is involved and linearity is no longer held. The correspondence between the low-resolution TRC and the full-resolution TRC is depicted in FIG. 8. The full spatial resolution TRC is a smoothed version of the low spatial resolution TRC at the resolution of the original image.

Figure 9:
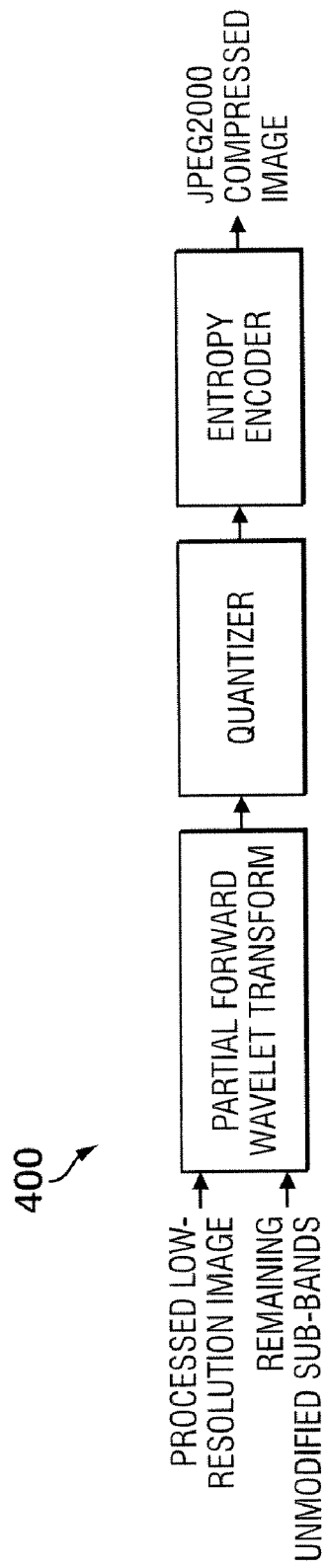

The forward decomposition step 400 essentially reverses the actions performed by the first module 210. Forward decomposition calculates the $N_L - T$ decomposition steps on the corrected, low-resolution image and the remaining, unmodified decomposition sub-bands, quantizes the resulting transform coefficients and entropy-encodes the resulting quantized coefficients, as depicted in FIG. 9.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method for compensating tones for performing streak compensation on a compressed digital image data, comprising:
- generating a compressed digital image from an input digital image data using a wavelet-based compression method;
- recovering a low resolution version of the input digital image data from the compressed digital image data by partially decompressing the compressed digital image;
- applying spatially varying compensating tone reproduction curves (TRC) to the low resolution version of the input digital image data to generate a streak compensated low resolution image;
- subsequently decompressing all of the compensated pixel arrays to produce decompressed compensated image data;
- wherein the partial decompression utilizes reversed multiple wavelet decomposition steps, and a number of reversed decomposition steps yields a low resolution image at the resolution of a desired streak compensation;
- wherein the number of reversed decomposition steps is based on the spatial resolution of the available TRCs; and,
- wherein the number of reversed steps combines the compressed digital image data from lowest frequency wavelet sub bands to form the partially decompressed compressed digital image
- performing recompression to the streak compensated low resolution image and combining the recompressed streak compensated low resolution image with remaining sub-bands to form a streak compensated compressed digital image.

2. The method of claim 1, wherein said compressed digital image data is lossy JPEG2000 encoded image data.

3. The method of claim 1, wherein the wavelet sub bands that are not combined in the partially decompressed image are combined with the input digital image data from the compensated low resolution image during the recompression step.

4. The method of claim 1, wherein the partial decompression utilizes entropy decoding and the recompression utilizes entropy coding.

5. The method of claim 1, wherein said compressed digital image data includes a plurality of color separation planes and said method further comprises:
- using at least the partially decompressed low resolution image for each of a plurality of color separation planes, compensating at least one of the partially decompressed low resolution images; and,
- performing tone compensation on the partially decompressed unit to produce a corrected unit in a first color plane.

6. The method of claim 5, wherein the plurality of color separation planes is selected from the group consisting of cyan, magenta, yellow, black, orange, green, violet, light cyan, light magenta, and grey.

7. The method of claim 6, wherein applying tone compensating curves utilizes a function that is dependent upon low resolution image data from more than one of the plurality of color separation planes to produce compensated image data for a single color separation.

8. In a printing system for processing document images, apparatus for performing streak compensation on compressed digital image data being operable to:
- generate a compressed digital image from an input digital image data using a wavelet-based compression method;
- recover a low resolution version of the input digital image data from the compressed digital image data by partially decompressing the compressed digital image;
- apply spatially varying compensating tone reproduction curves (TRC) to the low resolution version of the input digital image data to generate a streak compensated low resolution image;
- subsequently decompress all of the input digital image data to produce decompressed compensated image data;
- wherein said compressed digital image data is lossy wavelet encoded image data;
- wherein the partial decompression utilizes reversal of multiple wavelet decomposition steps, and a number of reversed steps yields a low resolution image at the resolution of a desired streak compensation;
- wherein the number of reversed steps is based on the resolution of the available TRCs;
- wherein the number of reversed steps is based on $(N_L-T)$;
- wherein the number of reversed steps combines the compressed digital image data from lowest frequency sub bands to form the partially decompressed digital image; and,
- wherein each successive decomposition step of the sub band has generally half of the horizontal and half of the vertical resolution of the previous step.

9. The printing system of claim 8, wherein subsequently decompressing all of the image data to produce decompressed compensated image data comprises decompressing the wavelet sub bands that are not decompressed and combines the decompressed image data with the compensated low resolution image.

10. The printing system of claim 9, wherein the partial decompression utilizes entropy decoding.

11. The printing system of claim 8, wherein said compressed digital image data includes a plurality of color separation planes and said printing system further operable to:
- use at least the partially decompressed low resolution image for each of a plurality of color separation planes, compensating at least one of the partially decompressed low resolution images;
- perform tone compensation on the partially decompressed unit to produce a corrected unit in a first color plane; and,
- the plurality of color separation planes is selected from the group consisting of cyan, magenta, yellow, black, orange, green, violet, light cyan, light magenta, and grey.

12. A method for performing streak compensation on a compressed digital image data, the method comprising:
- identifying a type compression applied to the image;
- directing the compressed digital image data to a streak compensation module suitable for performing streak compensation on the type of compressed digital image data;
- performing streak compensation using the compressed digital image data using the suitable streak compensation module;

wherein performing steak compensation includes applying spatially varying compensating tone reproduction curves;

wherein said type of compressed digital image data is run-length encoding;

decoding a run-length encoded stream to recover a full resolution image data;

applying a compensation to the data to obtain a spatially uniform data stream;

wherein the data source provides line art image data and the compressed data type is run-length encoding; and, wherein the identifying is performed by recognizing page description language commands.

13. The method of claim 12, wherein the identifying is performed by examining metadata embedded in the compressed digital image data.

14. The method of claim 12, wherein the identifying is performed by having knowledge of an image data source and the compressed data type that it produces.

* * * * *